United States Patent [19]

Hsing et al.

[11] Patent Number: 5,362,380
[45] Date of Patent: Nov. 8, 1994

[54] FLUID CATALYTIC CRACKING PROCESS YIELDING HYDROGEN

[75] Inventors: Hsu-Hui Hsing, Nederland; James Mudra, IV, Beaumont, both of Tex.

[73] Assignee: Texaco Inc., White Plains, N.Y.

[21] Appl. No.: 106,675

[22] Filed: Aug. 16, 1993

[51] Int. Cl.⁵ ............................................... C10G 9/32
[52] U.S. Cl. ..................................... 208/164; 208/51; 208/153
[58] Field of Search ............... 208/51, 50, 471, 113, 208/120, 408, 419, 164, 127, 163, 153; 502/55

[56] References Cited

U.S. PATENT DOCUMENTS

| | | | |
|---|---|---|---|
| 3,433,732 | 3/1969 | Leaman et al. | 208/111 |
| 3,726,791 | 4/1973 | Kimberlin, Jr. et al. | 208/127 |
| 3,929,431 | 12/1975 | Koh et al. | 48/214 |
| 4,113,602 | 9/1978 | Gorbaty et al. | 208/8 |
| 4,331,529 | 5/1982 | Lambert et al. | 208/8 R |

*Primary Examiner*—Asok Pal
*Assistant Examiner*—Bekir L. Yildirim
*Attorney, Agent, or Firm*—James L. Bailey; Kenneth R. Priem; Richard A. Morgan

[57] ABSTRACT

In a fluid catalytic cracking (FCC) process coked catalyst is partially regenerated by contacting with high temperature steam in the absence of oxygen. About 10 to 30% of the coke is converted to a steam reformed gas comprising hydrogen, methane and carbon dioxide. The off-gas may be subjected to cryogenic separation to yield a hydrogen-rich gas.

9 Claims, No Drawings

FLUID CATALYTIC CRACKING PROCESS YIELDING HYDROGEN

BACKGROUND OF THE INVENTION

1. Field of the Invention

The invention relates to a fluid catalytic cracking process. More particularly the invention relates to the regeneration of coked fluid catalytic cracking catalyst. Most particularly the invention relates to steam decoking of catalyst to yield a hydrogen-rich gas.

2. Other Related Methods in the Field

The fluid catalytic cracking (FCC) process is well-known. State of the art commercial catalytic cracking catalysts for this process are highly active and selective for converting hydrocarbon charge stocks to liquid fuel products. With such active catalysts it is preferable to conduct catalytic cracking reactions in a dilute phase transport type reaction system with a relatively short period of contact between the catalyst and the hydrocarbon feedstock.

In a state of the art process, a regenerated catalyst is fluidized in the lower portion of a riser transport line reactor and mixed with a hydrocarbon charge stock. Hydrocarbon conversion products including a liquid fuel boiling range product, gas and coked catalyst are discharged from the upper end of the riser reactor into a reactor vessel. In the reactor vessel, coked catalyst is separated in a cyclone separator and passed to a stripping section where hydrocarbon vapors are steam stripped from the catalyst. The resulting coke contaminated catalyst, termed spent catalyst, is collected in a spent catalyst standpipe and passed to a vertically arranged regenerator vessel containing a fluidized dense phase catalyst bed. The fluidization is maintained by upwardly flowing oxygen containing regeneration gas introduced by a gas distributor into the lower portion of the dense phase catalyst bed contained in the bottom of the regenerator vessel. Regeneration gas is supplied in excess of that required for complete oxidation of coke as indicated by the analysis of oxygen in flue gas. Above the dense phase catalyst bed is a dilute phase bed wherein residual carbon is oxidized at a temperature higher than in the dense phase bed. Reactivated catalyst, substantially reduced in coke (0.15 wt % or less) is passed vertically upwardly by the fluidizing regeneration gas to an upper portion of the dilute phase bed and into a regenerated catalyst standpipe where it is collected for reuse in the riser reactor.

U.S. Pat. No. 4,481,103 to F. J. Krambeck et al. discloses a fluid catalytic cracking (FCC) process for converting a sulfur containing hydrocarbon charge. Spent catalyst is subjected to steam stripping at a temperature of 500° C. to 700° C. for 1 to 10 minutes in the absence of oxygen. As a result, coke and sulfur are removed from the catalyst.

SUMMARY OF THE INVENTION

The invention is an improvement in a fluid catalytic cracking process in which a hydrocarbon feedstock is catalytically cracked in a reaction mixture at catalytic reaction conditions. As a result carbon is deposited on the catalyst and the catalyst is deactivated or spent. The reaction mixture is separated to form separated cracked hydrocarbon and separated spent catalyst.

In the improvement, separated spent catalyst is contacted with steam in an amount of 0.5 to 20 moles of steam per atom of carbon at a reforming conversion temperature of 1000° F. (537° C.) to 1200° F. (649° C.), in the absence of oxygen. As a result carbon is converted to a gaseous steam reformed mixture comprising hydrogen, carbon dioxide, carbon monoxide and methane. The steam reformed mixture is separated to yield a hydrogen-rich gas.

DETAILED DESCRIPTION OF THE INVENTION

According to the process of this invention, a freshly regenerated catalyst is suspended and thereby fluidized with a fluidization medium in a riser reactor. The regenerated catalyst has an amount of deposited carbon of about 0.15 wt % or less, typically 0.05 wt % to 0.1 wt %, and an ASTM microactivity of 60 to 72. The fluidization medium may be steam, nitrogen or low molecular weight hydrocarbons such as methane, ethane, ethylene or fuel gas. The amount of fluidization medium must be sufficient to fluidize the catalyst and to move it upwardly to the injection point of hydrocarbon feedstock.

Hydrocarbon feedstocks which are subjected to fluid catalytic cracking are distillate fractions derived from crude petroleum. These fractions include any of the intermediate distillate fractions. These intermediate distillate fractions may generally be described as having an initial boiling point heavier than the end point of gasoline.

Within this general range are a number of preferred fractions for the process. These include naphtha, kerosene, diesel, gas oil and vacuum gas oil. The most preferred fractions for fluid catalytic cracking are the gas oil and vacuum gas oil fractions. Traditionally gasoline has a boiling range of $C_5$ or 90° F. (32° C.) to 430° F. (221° C.). Naphtha has a boiling range of 90° F. (32° C.) to 430° F. (221° C). Kerosene has a boiling range of 360° F. (182° C.) to 530° F. (276° C.). Diesel has a boiling range of 360° F. (182° C.) to about 650° F.–680° F. (343°–360° C.). The end point for diesel is 650° F. (343° C.) in the United States and 680° F. (360° C.) in Europe. Gas oil has an initial boiling point of about 650° F. (343° C.) to 680° F. (360° C.) and an end point of about 800° F. (426° C.). The end point for gas oil is selected in view of process economics and product demand and is generally in the 750° F. (398° F.) to 800° F. (426° C.) range with 750° F. (398° C.) to 775° F. (412° C.) being most typical. Vacuum gas oil has an initial boiling point of 750° F. (398° C.) to 800° F. (426° C.) and an end point of 950° F. (510° C.) to 1100° F. (593° C.). The initial boiling point and end point are defined by the hydrocarbon component distribution in the fraction as determined by fractionation analyses, ASTM D-86 or ASTM D-1160 distillation.

Commercial catalysts for use in a fluid catalytic cracking (FCC) process have been developed to be highly active for the conversion of relatively heavy intermediate distillates such as gas oil and vacuum gas oil into relatively lighter intermediate distillates such as naphtha, gasoline, $C_4$ olefins and elemental carbon. Catalysts, include those catalyst commonly referred to as "zeolite" or "molecular sieve" cracking catalysts. Such catalyst are referred to in the art as zeolite catalyst. Zeolite catalysts comprise about 50–90 wt % amorphous refractory metal oxide matrix, and about 10–50 wt %, preferably 10–25 wt %, crystalline aluminosilicate zeolite molecular sieves, having uniform crystalline pore openings, dispersed within said matrix. The matrix generally has substantial cracking activity and is selected from naturally occurring clays, and synthetic oxide mixtures such as silica-alumina, silica magnesia, silica-zirconia, etc. The zeolitic portion of the zeolite cracking catalyst comprises small particles of either natural or synthetic crystalline, alumino-silicate zeolitic molecular sieves, such as faujasite, chabazite, X-type or Y-type alumino-silicate materials, etc., having a major portion of their sodium content replaced by ion exchange with rare earth ions, ammonium ions, hydrogen ions and/or divalent and polyvalent ions which enhance the catalyst activity. A preferred class of these cracking catalysts includes the ones comprising zeolite silica-alumina molecular sieve in admixture with amorphous inorganic oxides such as silica-alumina, silica-magnesia and silica zirconia.

The catalyst is regenerated in a cyclic reuse according to the fluid catalytic cracking (FCC) process to maintain an ASTM D-3907 microactivity in the range of 60 to 72.

The catalyst suspension is contacted with the hydrocarbon feedstock at a catalytic reaction temperature of 900° F. (482° C.) to 1200° F. (659° C.) at a pressure of 10 psia (0.7 atm) to 45 psia (3.06 atm) and a residence time of 0.2 to 10 seconds, preferably 0.5 to 5 seconds. The resulting reaction mixture comprises cracked hydrocarbon and inactivated or spent catalyst. The catalyst is deactivated by the deposition of elemental carbon thereon. In the art, this deposited carbon is referred to as coke.

The cracked hydrocarbon comprises a mixture of gaseous hydrocarbons, predominantly naphtha, gasoline, $C_4$ olefins, methane and hydrogen. This cracked hydrocarbon is separated from spent catalyst in a series of one to three cyclone separators. The separated cracked hydrocarbon is withdrawn from the reactor vessel and separated again by fractional distillation to yield naphtha and gasoline, the primary products of the fluid catalytic cracking (FCC) process.

Separated spent catalyst is withdrawn from the diplegs of the cyclone separators and passed to a stripping zone. In the stripping zone spent catalyst is subjected to countercurrent steam stripping for 0.5 to 10 minutes at 500° F. (260° C.) to 700° F. (371° C.) to remove cracked hydrocarbons entrained in the deposited coke. These stripped, cracked hydrocarbons mixed with stripping steam are withdrawn from the reactor vessel with cracked hydrocarbons from the cyclone separators. The remaining spent catalyst comprises a layer of deposited carbon which coats the catalyst. This coating of carbon deactivates catalyst by physically blocking catalytically active sites from contact with feedstock. Deactivated catalyst is reactivated by removing the deposited carbon. It is conventional to reactivate the catalyst by contacting with an oxygen-containing gas, such as air to oxidize the carbon.

The total amount of deposited carbon varies between 0.5 wt % and 2 wt % based on the total weight of the carbon coated catalyst particles. Typically the amount of carbon is 1 wt %. Ideally, a catalyst regeneration should remove all deposited carbon. In practice, reducing carbon to 0.05 wt % to 0.15 wt % restores catalytic activity sufficient for commercial purposes to an ASTM D-3907 microactivity of 60 to 72. Additional carbon removal, below 0.05 wt % is possible, but is not commercially justified at the present time.

According to the invention, deactivated catalyst is contacted with steam in the absence of oxygen. The steam is in an amount of 0.5 to 20 moles of steam per atom of carbon, preferably about 2 to 6 moles of steam per atom of carbon. This contacting is carried out at a temperature of 1000° F. (537° C.) to 1200° F. (649° C.) and as a result steam reacts with carbon to form hydrogen, carbon dioxide, carbon monoxide and methane. It has been found that over a period of time of 0.5 to 30 minutes, 10% to 40% of the deposited carbon can be converted to this gaseous steam reformed mixture.

Criticality has been discovered in constraining the temperature to 1000° F. (537° C.) to 1200° F. (649° C.). At temperatures below 1000° F. (537° C.) the thermodynamic equilibrium favors the production of methane which is not the objective of the process. Also, the reaction of steam with carbon is slowed, lengthening regeneration time.

At temperatures above 1200° F. (649° C.) the methane-forming and carbon monoxide-shift reactions favor the production of hydrogen according to the reactions:

$$CH_4 + H_2O \rightleftharpoons CO + 3H_2$$

$$CO + H_2O \rightleftharpoons CO_2 + H_2$$

However, above 1200° F. (649° C.), deactivation of catalyst is increased and the process becomes economically less advantageous for commercial use. Accordingly, Inventors have discovered that a reforming conversion temperature of 1000° F. (537° C.) to 1200° F. (649° C.) yields a commercially advantageous amount of hydrogen without significant catalyst deactivation.

At this reforming conversion temperature, 10% to 40%, typically 10% to 30% of carbon is removed. This reduces the original 0.5 wt % to 2 wt % of deposited carbon to 0.3 wt % to 1.8 wt %. The catalyst removed from steam reforming is referred to as partially regenerated. The amount of carbon removed is not sufficient to reactivate the catalyst for cyclic reuse in the fluid catalytic cracking (FCC) process.

The containment vessel for carrying out the steam reforming reaction must be large enough to contain an amount of catalyst of about 20% of the entire catalyst inventory. In the vessel, this amount of catalyst is contained in a moving bed, fluidized with oxygen-free steam. An inlet port allows for delivery of catalyst from the reactor vessel. An outlet port provides for discharge of partially regenerated catalyst to the air decoking regenerator.

The partially regenerated catalyst is subjected to a second, conventional regeneration with an oxygen-containing regeneration gas such as air to complete regeneration of catalyst.

Partially regenerated catalyst is regenerated by contacting in a fluidized bed with an oxygen-containing gas such as air. The amount of oxygen-containing regeneration gas necessary to regenerate the catalyst will depend upon the amount of carbon deposition remaining on the catalyst. Generally oxygen is provided in an amount sufficient to effect substantially complete oxidation of the carbon from the catalyst and to provide an oxygen concentration in the flue gas from the regeneration zone of from about 1 mole % to about 10 mole %, and preferably from about 2 mole % to about 5 mole %.

In regenerating partially regenerated catalyst, the catalyst is subjected to temperatures of 1000° F. (537° C.) to 1500° F. (815° C.). In general, because the catalyst is partially regenerated, final catalyst regeneration is carried out at less than conventionally severe conditions. In the alternative, high coking feedstocks can be processed. The preferred zeolite catalysts may be subjected to temperatures somewhat above 1325° F. (718° C.), without substantially degrading their catalytic activity. At temperatures above about 1500° F. (815° C.), the structure and/or composition of the catalyst is affected in such a way that the catalyst irreversibly looses at least a portion of its catalytic activity. Regeneration pressures range from 10 psia (0.7 atm) to 65 psia (4.4 atm). These conditions produce a carbon burning rate of 0.05 lb to 1.0 lb of carbon per hour per pound of catalyst. Under these conditions, carbon may be reduced to 0.15 wt % or less, typically 0.05 wt % to 0.1 wt %. This regenerated catalyst is passed to a regenerated catalyst standpipe for reuse in the process.

An objective of the process is to produce a hydrogen-rich gas from the gaseous steam reformed mixture. Various methods for upgrading a hydrogen-containing gas to produce a hydrogen-rich gas can be used. Cooling the gaseous steam reformed mixture in several stages to a temperature of 70° K. to 300° K. may be used to produce a hydrogen-rich gas comprising 90 mol % to 97 mol % hydrogen. This hydrogen purity is sufficient for many applications, such as the catalytic hydrogenation of liquid fuels. Such processes are described, for example, in U.S. Pat. No. 3,073,093 to C. R. Baker et al. and U.S. Pat. No. 3,628,340 to J. Meisler incorporated herein by reference.

A chemical reagent grade hydrogen-rich gas comprising 97 mol % to 99.9 mol % hydrogen cannot be made by cryogenic purification alone. To achieve these purities combinations of cryogenic purification and either adiabatic pressure-swing adsorption or membrane separation is required. Such processes are described in U.S. Pat. No. 3,839,847 to G. C. Banikiotes et al., U.S. Pat. No. 4,043,770 to F. Jakob and U.S. Pat. No. 4,242,875 to A. E. Schaefer, all incorporated herein by reference.

This invention is shown by way of Example.

EXAMPLE 1

Coked fluid cracking catalyst was placed into three sample bombs under nitrogen blanket. Water was added to sample bombs A and B in an amount of 0.07 ml per gram of catalyst. The three sample bombs were then baked for 2 days at 1100° F. (593° C.).

The sample bombs were purged and the off-gas analyzed for composition by gas chromatography. Carbon-on-catalyst was measured according to ASTM D-5291. Results were as follows:

TABLE I

| Carbon-On-Catalyst, wt % | A (Water) | B (Water) | C |
|---|---|---|---|
| Initial | 1.005 | 0.9554 | 1.051 |

TABLE I-continued

| Carbon-On-Catalyst, wt % | A (Water) | B (Water) | C |
|---|---|---|---|
| Final | 0.71 | 0.7301 | 1.001 |

TABLE II

| Composition, Vol % | A | B | C |
|---|---|---|---|
| $H_2$ | 13.8 | 16.86 | — |
| $CH_4$ | 19.2 | 20.54 | — |
| $CO_2$ | 18.0 | 24.05 | — |
| CO | 0 | 0 | — |
| $N_2$ | 49.0 | 38.55 | — |

EXAMPLE 2

In a fluid catalytic cracking pilot unit, steam was injected into the steam stripper in the absence of oxygen at a temperature of 1100° F. (593° C.) to 1200° F. (649° C.). Off-gas was collected at four different temperatures and analyzed for composition by gas chromatography.

TABLE III

| | D | E | F | G |
|---|---|---|---|---|
| Temperature | 1100° F.–1200° F. (593° C.–649° C.) | 1100° F.–1200° F. (593° C.–649° C.) | 1100° F. (593° C.) | 662° F. (350° C.) |
| Off-Gas Composition, Vol % | | | | |
| $H_2$ | 49.64 | 42.6 | 32.44 | 0 |
| $CH_4$ | 2.24 | 5.52 | 4.7 | 0 |
| CO | 4.96 | 5.42 | 1.6 | 0 |
| $CO_2$ | 19.34 | 11.19 | 9.9 | 0 |
| $H_2S$ | 3.79 | 5.92 | 2.15 | 0 |
| $N_2$ | 19.67 | 28.6 | 48.49 | 0 |
| $C_6+$ | 0.36 | 0.76 | 0.70 | 0 |

An objective of this invention is to lower the coke content of the spent catalyst which will lower the regenerator temperature during conventional regeneration with air. The lower regenerator temperature, in turn, will allow processing of heavier feedstock or a higher catalyst circulation rate to increase conversion. The advantages of the lower regenerator temperature resulting from present invention are shown in the following examples.

EXAMPLE 3

A removal of 20% coke from spent catalyst by the invention will lead to the following shifts in operation conditions and conversion predicted by a simulator.

TABLE IV

| Coke on Spent Catalyst | Regenerator Temperature | Catalyst/Oil | Conversion |
|---|---|---|---|
| Base | 1361° F. | 5.5 | 82.23 |
| −20% | 1276° F. | 7.2 | 84.19 |

EXAMPLE 4

A removal of 20% of the coke by the invention will allow the processing of heavier feedstock without increasing regenerator temperature as demonstrated by the simulator.

TABLE V

| Coke on Spent Catalyst | Feed | Gravity, API | Sulfur | Basic Nitrogen |
|---|---|---|---|---|
| Base | Base | 24.79° | 0.8 wt. % | 264 ppm |
| −20% | Heavier | 21.50° | 2.00 wt. % | 600 ppm |

The invention provides for a lower regenerator temperature, which, in turn, will allow the processing of heavier feedstock while maintaining regenerator temperature and will allow a high catalyst circulation rate at constant riser outlet temperature to achieve higher conversion as demonstrated in Examples 3 and 4.

While particular embodiments of the invention have been described, it will be understood, of course, that the invention is not limited thereto since many modifications may be made, and it is, therefore, contemplated to cover by the appended claims any such modification as fall within the true spirit and scope of the invention.

What is claimed is:

1. A fluid catalytic cracking process comprising:
   (a) cracking a hydrocarbon feedstock in suspension with a fluidized regenerated catalyst at a catalytic reaction temperature to form a reaction mixture of cracked hydrocarbon and spent catalyst, said spent catalyst comprising 0.5 wt % to 2 wt % deposited carbon thereon;
   (b) separating said reaction mixture to form separated cracked hydrocarbon and separated spent catalyst;
   (c) contacting said separated spent catalyst with steam in an amount of about 0.5 to 20 moles of steam per atom of carbon at a conversion temperature of 1000° F. (537° C.) to 1200° F. (649° C.) in the absence of oxygen for a period of time sufficient to produce: (i) a steam reformed mixture comprising hydrogen, carbon dioxide, carbon monoxide, and methane and (ii) a partially regenerated catalyst comprising 0.3 wt % to 0.8 wt % deposited carbon thereon;
   (d) separating said partially regenerated catalyst and regenerating at a regeneration temperature of 1000° F. (537° C.) to 1500° F. (815° F.) in the presence of oxygen in an amount in excess of that required to react with all of the deposited carbon to produce oxides of carbon, thereby yielding regenerated catalyst.

2. The process of claim 1 additionally comprising: passing the regenerated catalyst of step (d) to the cracking of step (a).

3. The process of claim 1 wherein in step (d) the oxygen is in an amount of 0.1 to 10 mol %.

4. The process of claim 1 wherein in step (d) the regenerated catalyst comprises 0.05 to 0.15 wt % carbon deposited thereon.

5. The process of claim 1 wherein the catalytic reaction temperature is 900° F. (482° C.) to 1200° F. (659° C.).

6. The process of claim 1 additionally comprising:
   chilling said gaseous steam reformed mixture to a cryogenic temperature of 70° K. to 300° K. and separating to yield a hydrogen-rich gas comprising 90 vol % to 97 vol % hydrogen.

7. Process of claim 1 wherein the hydrocarbon feedstock in step (a) has a gravity of 21° API or less.

8. The process of claim 1 wherein the regenerator temperature in step (d) is 1,000° F. (537° C.) to 1300° F. (704° C).

9. The process of claim 1 additionally comprising: separating steam reformed mixture of step (c) (i) to yield a hydrogen-rich gas.

* * * * *